United States Patent
Nonaka et al.

(10) Patent No.: US 7,711,467 B2
(45) Date of Patent: May 4, 2010

(54) SIDE DOOR COLLISION DETECTING SYSTEM AND OCCUPANT PROTECTING SYSTEM

(75) Inventors: Toshihito Nonaka, Chiryu (JP); Satoru Takehara, Obu (JP); Minoru Fujioka, Anjo (JP)

(73) Assignee: Denso Corporation, Kariya (JP)

( * ) Notice: Subject to any disclaimer, the term of this patent is extended or adjusted under 35 U.S.C. 154(b) by 837 days.

(21) Appl. No.: 11/413,144

(22) Filed: Apr. 27, 2006

(65) Prior Publication Data

US 2006/0244245 A1 Nov. 2, 2006

(30) Foreign Application Priority Data

Apr. 27, 2005 (JP) ............... 2005-129921

(51) Int. Cl.
*B60R 21/00* (2006.01)
*B60T 7/22* (2006.01)

(52) U.S. Cl. ............ 701/45; 280/735; 180/274
(58) Field of Classification Search ......... 701/45–48; 280/728.1, 734–735; 180/271, 274; 340/425.5, 340/438
See application file for complete search history.

(56) References Cited

U.S. PATENT DOCUMENTS 4,991,682 A * 2/1991 Kuntz et al. ........... 180/282

5,748,075 A 5/1998 Dirmeyer et al.
2007/0035182 A1 2/2007 Wellhoefer et al.

FOREIGN PATENT DOCUMENTS

| DE | 42 40 399 | 6/1994 |
|---|---|---|
| DE | 198 58 760 | 6/2000 |
| JP | 02-249740 | 10/1990 |
| JP | 9-58401 | 3/1997 |

OTHER PUBLICATIONS

Office Action dated Feb. 12, 2007 in German Application No. 10 2006 018901.9-21 with English translation.
Office Action dated 7/09/209 in corresponding Japanese Application No. 2005-129921.

* cited by examiner

*Primary Examiner*—Yonel Beaulieu
(74) *Attorney, Agent, or Firm*—Harness, Dickey & Pierce, PLC

(57) ABSTRACT

In a side door collision detecting system for a vehicle, an internal pressure sensor detects a door internal pressure of a side door of the vehicle. The internal pressure sensor outputs an internal pressure signal based on the door internal pressure, and the internal pressure sensor is installed in an interior space of the side door. A physical value sensor detects a physical value and outputs a physical value signal based on the physical value. The physical value sensor is installed in the interior space of the side door. A collision determining circuit determines whether the side collision occurs based on the internal pressure signal and the physical value signal.

9 Claims, 4 Drawing Sheets

THRESHOLD LEVEL 1 > THRESHOLD LEVEL 2

THRESHOLD LEVEL 1 > THRESHOLD LEVEL 2
THRESHOLD LEVEL 4 > THRESHOLD LEVEL 3

SIDE DOOR COLLISION DETECTING SYSTEM AND OCCUPANT PROTECTING SYSTEM

CROSS REFERENCE TO RELATED APPLICATION

This application is based on and incorporates herein by reference Japanese Patent Application No. 2005-129921 filed on Apr. 27, 2005.

BACKGROUND OF THE INVENTION

1. Field of the Invention

The present invention relates to a side door collision detecting system for detecting collision to a side door of the vehicle and relates to an occupant protecting system, which protects an occupant of the vehicle when the collision occurs.

2. Description of Related Art

Japanese Unexamined Patent Publication H2-249740 discloses a system that inflates a side airbag when the system detects a collision of a subject to a side door of a vehicle by use of a pressure sensor installed in an interior enclosed space (air tank) of the side door of a vehicle. Hereinafter, the above-described system is named as a pressure based side door collision detecting system.

Also, a well-known method includes a safing sensor (impact sensor), which has a semiconductor acceleration sensor or a reed switch installed on a pillar of the vehicle or a floor of the vehicle. The safing sensor detects an impact of a side collision by use of the semiconductor acceleration sensor or the reed switch, which detects an impact force generated when the pillar or the floor is deformed, so as to inflate the side door airbag. Hereinafter the above-described method is named as an impact force based side collision detecting method.

The above pressure based side door collision detecting system advantageously detects any side collision, which takes place at any part of the side door, by use of the pressure sensor (door internal pressure sensor) installed in the enclosed space inside the side door. Also, the above impact force based side collision detecting method advantageously detects non-side collision, which does not take place on the side door, because the deformation of the pillar or the floor due to the non-side collision is detected in this method.

It is preferable to determine the side collision based on a logical conjunction of an output signal supplied by the door internal pressure sensor and an output signal supplied by the impact sensor, which detects the deformation of the pillar or the floor, in order to limit a faulty determination of the side door collision. Here, the faulty determination may be made due to an increased door internal pressure, which is not based on the side door collision, or due to the deformation of the pillar or the floor, which is not based on the side door collision. Thus, a degree of accuracy in detecting the side door collision is advantageously increased. For example, the collision may be detected based on the deformation of the pillar or the floor, and the collision location may be identified as the side door based on an increase of the door internal pressure. Also, even when the side door is strongly closed and the impact sensor outputs a large signal, the faulty determination of the side collision may be limited because the door internal pressure may not change very much at this time.

However, in the above combination system, the impact sensor installed on the pillar or the floor may disadvantageously output a small signal when a pole, which has a small collision area, such as a trolley pole or a stand, collides with an easily deformable side door. Also, the impact sensor installed on the pillar or the floor may be located away from the side door, which is the collision location. Thus, the deformation may take time to be transmitted to the impact sensor, and an attenuated signal due to the transmission may deteriorate a sensitivity of the impact detection.

The above conventional airbag inflating system for the side door collision and other airbag inflating systems have been desired to limit the faulty inflation of the airbag also to accurately detect the side collision to the side door without delay.

SUMMARY OF THE INVENTION

It is therefore an object of the present invention to provide a side door collision detecting system, which obviates or mitigates at least one of the above disadvantages.

To achieve the objective of the present invention, there is provided a side door collision detecting system for a vehicle, which includes an internal pressure sensor, a physical value sensor, and a collision determining circuit. The internal pressure sensor detects a door internal air pressure of a side door of the vehicle. The internal pressure sensor outputs an internal pressure signal based on the door internal pressure, and the internal pressure sensor is installed in an interior space of the side door. The physical value sensor detects a physical value and outputs a physical value signal based on the physical value. The physical value sensor is installed in the interior space of the side door. The collision determining circuit determines whether the side collision occurs based on the internal pressure signal and the physical value signal.

To achieve the objective of the present invention, there is also provided a occupant protecting system for a vehicle, which includes the above side door collision detecting system and an occupant protecting device. The occupant protecting device performs a protection of an occupant of the vehicle based on a determining result of the collision determining circuit of the side door collision detecting system.

To achieve the objective of the present invention, there is also provided a side door collision detecting system for a vehicle, which includes a plurality of physical value sensors and a collision determining circuit. Each of the plurality of physical value sensors detects a corresponding physical value changed by a side collision to a side door of the vehicle. Each of the plurality of physical value sensors outputs a corresponding physical value signal, which corresponds to the corresponding physical value. Each of the plurality of physical value sensors is installed in an interior space of the side door. Each corresponding physical value is other than a door internal pressure of the side door. The collision determining circuit determines whether the side collision occurs based on the corresponding physical value signals outputted by the plurality of physical value sensors.

To achieve the objective of the present invention, there is also provided a occupant protecting system for a vehicle, which includes the above side door collision detecting system and an occupant protecting device. The occupant protecting device performs a protection of an occupant of the vehicle based on a determining result of the collision determining circuit of the side door collision detecting system.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

First Embodiment

Figure 1:
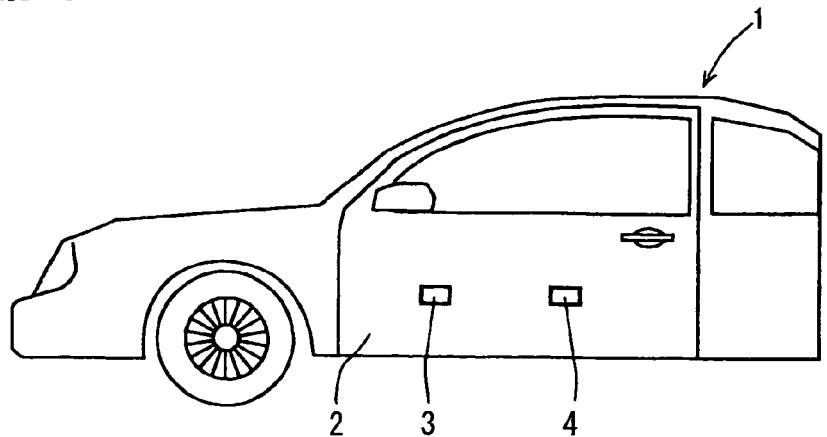
FIG. 1 is a schematic diagram of a side door collision detecting system according to a first embodiment.

In FIG. 1, an interior space of a side door 2 of a vehicle 1 is generally enclosed, and the side door 2 includes a door internal pressure sensor 3 and an acceleration sensor 4, which are arranged at a predetermined interval in a longitudinal direction of the vehicle 1 in the interior space. In the first embodiment, the door internal pressure sensor 3 is located at a front side of the side door 2. The acceleration sensor 4, which serves as a physical value sensor, is located at a back side thereof.

Figure 2:
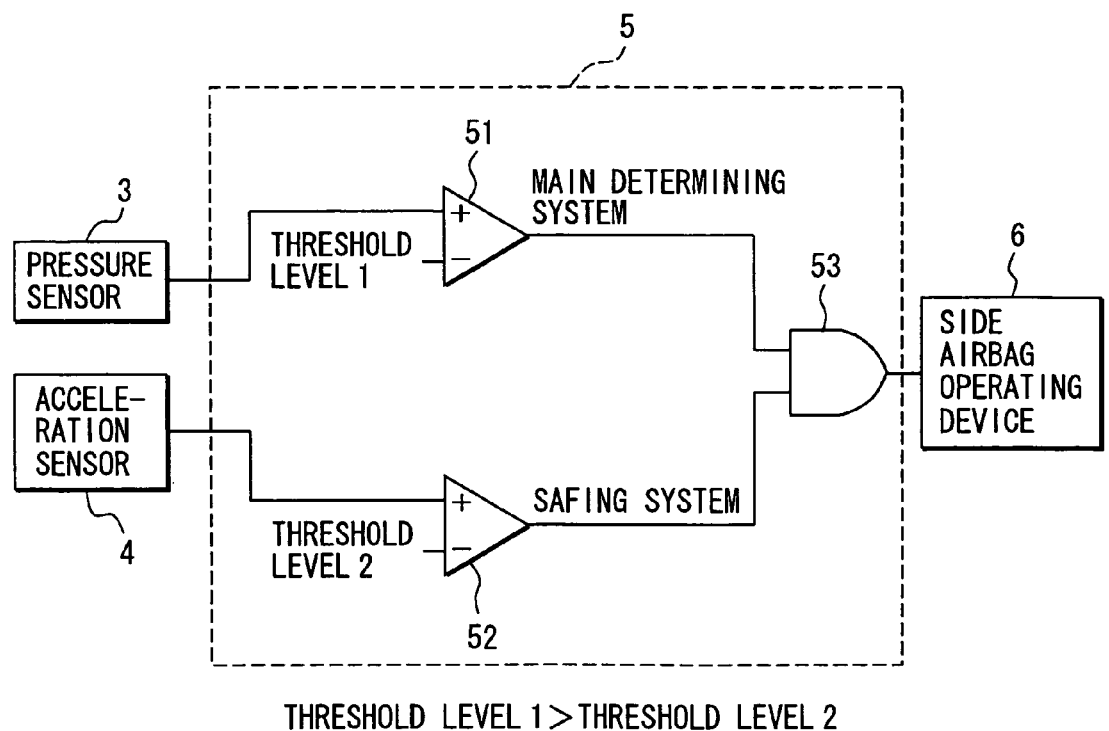
FIG. 2 is a schematic circuit diagram showing the side door collision detecting system according to the first embodiment.

In FIG. 2, a side door collision determining circuit 5 includes comparators 51, 52, an AND gate 53 and a buffer amplifier (not shown), which amplifies an output signal supplied by the AND gate 53. An output voltage from the buffer amplifier is supplied to a side airbag operating device 6. The side door collision determining circuit 5 and the side airbag operating device 6 are located inside the vehicle, such as a console box of the vehicle. However, they may be located at different places. The door internal pressure sensor 3 includes a semiconductor pressure sensor, which is received in a resin package. The acceleration sensor 4 includes a semiconductor acceleration sensor, which is received in a resin package. These semiconductor pressure sensor and semiconductor acceleration sensor are well known, and therefore explanation thereof is omitted. The door internal pressure sensor 3, which mainly detects the side door collision, is named as a main sensor for detecting the side door collision, and the acceleration sensor 4, which secondarily detects the side door collision, is named as a safing sensor for detecting the side door collision.

An operation of the present embodiment will be described. The output signal supplied by the door internal pressure sensor 3 is converted into a binary signal by the comparator 51. The output signal supplied by the acceleration sensor 4 is converted into a binary signal by the comparator 52. The two binary signals are inputted into the AND gate 53. The AND gate 53 outputs a final determining result of the side door collision, which is described as a logical conjunction signal of the two binary signals, to the side airbag operating device 6. Here, the logical conjunction signal from the AND gate 53, which serves as a logical conjunction calculating means, indicates a high level binary signal only when both the two binary signals from the comparators 51, 52 indicate the high level binary signals. Otherwise, the logical conjunction signal indicates a low level binary signal. Then, the side airbag operating device 6 inflates the side airbag when the conjunction signal, which is outputted by the AND gate 53, indicates the high level binary signal. Here, a signal pass through the comparator 51 may be named as a main determining system, and another signal pass through the comparator 52 may be named as a safing system.

In the present embodiment, a corresponding threshold value for each of the comparators 51, 52 is set such that the comparator 52 outputs the high level binary signal even when the collision impact force to the side door is so small that the comparator 51 outputs the low level binary signal. Specifically, a threshold level 2, which corresponds to the comparator 52, is set substantially smaller than a threshold level 1, which corresponds to the comparator 51.

In the present embodiment, the door internal pressure sensor 3 is installed in the interior space of the side door 2, and the acceleration sensor 4, which serves as the physical value sensor, is also installed in the interior space of the side door 2. Therefore, the collision is detected without delay compared with the conventional case, where an impact sensor, which is installed in the pillar or the floor, detects a deformation of the pillar or the floor. Also, deterioration of a degree of accuracy in detecting the side collision is limited, the deterioration being caused due to an attenuated impact force while the impact force is transmitted from the side door to the pillar or the floor. Therefore, the degree of the accuracy in detecting the side door collision is increased.

In the present embodiment, the side collision to the side door 2 is identified only when an increase of the door internal pressure due to the side collision to the side door 2 is detected by the door internal pressure sensor 3 and at the same time the impact force of the deformation of the side door panel is detected by the acceleration sensor 4. Thus, a faulty detection of the side collision is substantially limited such that the degree of the accuracy in detecting the side collision to the side door 2 is increased.

Specifically, in the present embodiment, even when one of the side door collision sensors makes a faulty determination, a protecting device, such as the airbag, may not be operated. Thus, reliability of the system is improved.

A first modification of the first embodiment will be described. In the above embodiment, the AND gate 53 is used. However, an OR gate may be alternatively used. In the first modification, the side collision can be detected in the following two cases. In a first case, the deformation of the side door panel due to the side collision is so small that the output from the acceleration sensor 4 does not reach the threshold level 2. In the first case, however, the output from the door internal pressure sensor 3 is substantially large. In contrast, in a second case, the increase of the door internal pressure due to the side collision is so small that the output from the door internal pressure sensor 3 does not reach the threshold level 1. In the second case, however, the output from the acceleration sensor 4 due to the deformation of the door is substantially large.

A second modification of the first embodiment will be described. In the first embodiment, the acceleration sensor 4 serves as the safing sensor. However, any sensor may alternatively serve as the safing sensor if the any sensor, which is well known or are equivalent to the well-known sensor, can detect the impact due to the side collision. Also, another pressure sensor, which detects the door internal pressure similarly to the door internal pressure sensor 3, may alternatively serve as the safing sensor. In any case, any sensor, serving as the physical value sensor, is installed in the interior space of the side door 2 together with the door internal pressure sensor 3 such that the delay of operating the side airbag operating device 6 due to delay of output by the physical value sensor is limited.

A third modification of the first embodiment will be described. A combination of the output signal level (high or low) supplied by the door internal pressure sensor 3 and the output signal level (high or low) supplied by the acceleration sensor 4 for determination may be alternatively modified as a combination shown in FIG. 3. A determining process for determining the side door collision in the third modification of the first embodiment will be described.

Figure 3:
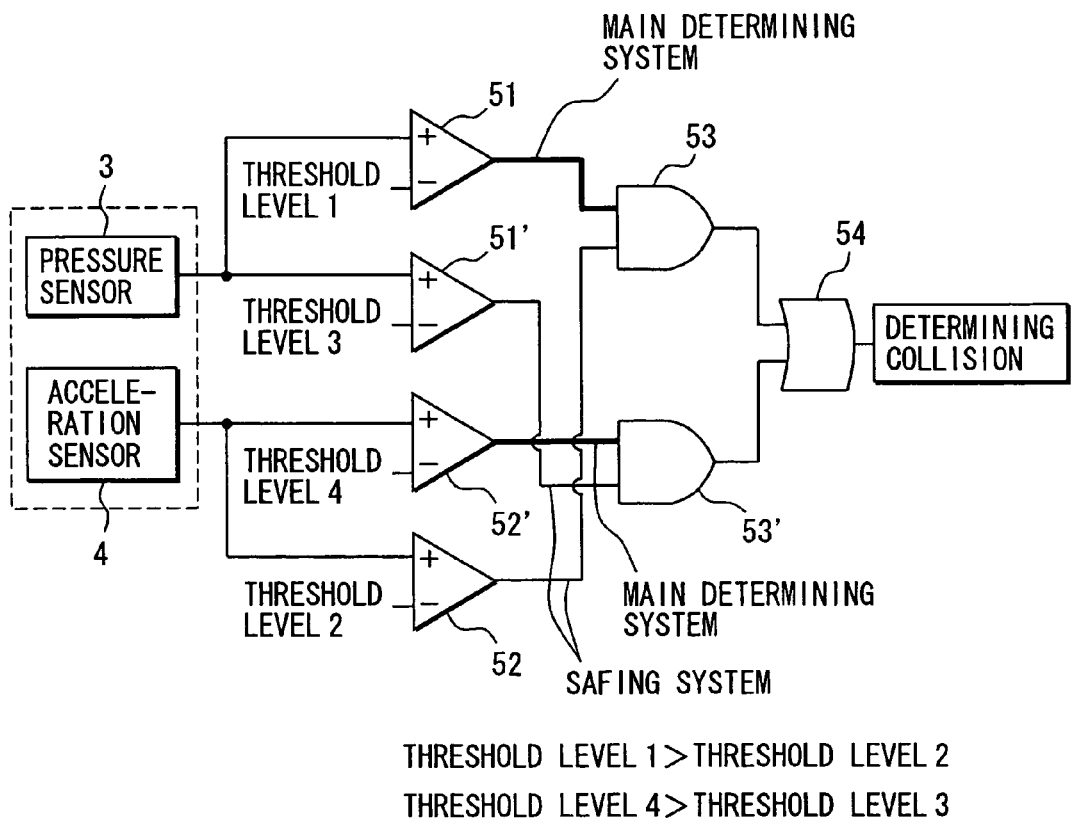
FIG. 3 is a schematic circuit diagram showing a modification of the first embodiment.

A circuit shown in FIG. 3 additionally includes comparators 51', 52', an AND gate 53' and an OR gate 54 in addition to the circuit shown in FIG. 2. Here, the door internal pressure sensor 3 serves as the main sensor, and the acceleration sensor 4 serves as the safing sensor. The comparators 51, 52 and the AND gate 53 perform in the same way as the circuit in the first embodiment shown in FIG. 2. Thus, a second determining system, which includes the comparators 51', 52' and the AND gate 53', will be described.

The output signal supplied by the door internal pressure sensor 3 is converted into a binary signal by the comparator 51'. The output signal supplied by the acceleration sensor 4 is converted into a binary signal by the comparator 52'. The two binary signals are inputted into the AND gate 53'. The AND gate 53' outputs a determining result of the side door collision, which is described as a logical conjunction signal of the two binary signals, to the OR gate 54. Here, the OR gate 54, which serves as a logical addition calculating means, outputs a logical addition signal, which indicates the high level binary signal when at least one of the two logical conjunction signals supplied by the two AND gates 53, 53' indicates the high level binary signal. In contrast, the OR gates 54 outputs the logical addition signal, which indicates the low level binary signal when both the two logical conjunction signals indicate the low level binary signals. Thus, in the present modification, the second determining system also detects the side door collision in addition to the determining system shown in FIG. 2. Here, a signal pass through the comparator 52' may be named as the main determining system, and another signal pass through the comparator 51' may be named as the safing system.

In the third modification of the first embodiment, a corresponding threshold value for each of the comparators 51', 52' is set such that the comparator 51' outputs a high level binary signal even when the collision impact force to the side door 2 is so small that the comparator 52' outputs a low level binary signal. Specifically, a threshold level 3, which corresponds to the comparator 51', is set substantially smaller than a threshold level 4, which corresponds to the comparator 52'. Also, the threshold level 2, which corresponds to the comparator 52, is set substantially smaller than the threshold level 1, which corresponds to the comparator 51.

Specifically, a threshold value of the comparator 51 is set larger than that of the comparator 51'. Also, a threshold value of the comparator 52' is set larger than that of the comparator 52. Thus, the degree of accuracy in detecting the side door collision is increased.

Second Embodiment

Figure 4:
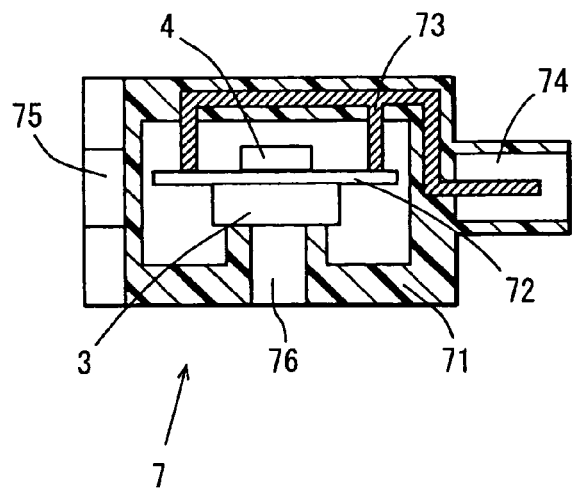
FIG. 4 is a schematic sectional view showing a side door side collision sensor of a side door collision detecting system according to a second embodiment.

A structure of the door internal pressure sensor 3 and the acceleration sensor 4 in the first embodiment will be desecrated with reference to FIG. 4. Similar components of a side door collision detecting system of the present embodiment, which are similar to the components of the side door collision detecting system of the first embodiment, will be indicated by the same numerals.

An integrated sensor 7 includes a sensor housing 71, the door internal pressure sensor 3 and the acceleration sensor 4. The door internal pressure sensor 3 and the acceleration sensor 4 are included in the sensor housing 71. The door internal pressure sensor 3 is a semiconductor pressure sensor, which is structured as a resin-mold integrated circuit (IC). Also, the acceleration sensor 4 is a semiconductor acceleration sensor, which is also structured as the resin-mold IC. These sensors are well known and therefore, explanation thereof is omitted. The door internal pressure sensor 3 is rigidly mounted on a principle surface of a substrate 72, which is made of ceramics or a resin. Also, the acceleration sensor 4 is rigidly mounted on a back surface of the substrate 72. A terminal 73 is insert molded into the sensor housing 71, and one end of the terminal 73 is fixed to the substrate 72 and the other end thereof projects inside a connector portion 74. Thus, the door internal pressure sensor 3 and the acceleration sensor 4 are externally supplied with power through the terminal 73 and the substrate 72. Also, output signals supplied by the door internal pressure sensor 3 and the acceleration sensor 4 are outputted through the substrate 72 and the terminal 73. A mounting portion 75 mounts the sensor housing 71 on the side door panel (not shown) or on a connecting member, which is connected with the side door panel. A pressure introducing port 76 applies the door internal pressure to a diaphragm portion (not shown) of the door internal pressure sensor 3.

This structure facilitates the installation of the door internal pressure sensor 3 and the acceleration sensor 4 to the side door, which may have a narrow space for the installation. Also, this structure reduces either a number of the necessary components or an amount of necessary materials. Further, wiring and signal processing may be facilitated.

Third Embodiment

Figure 5:
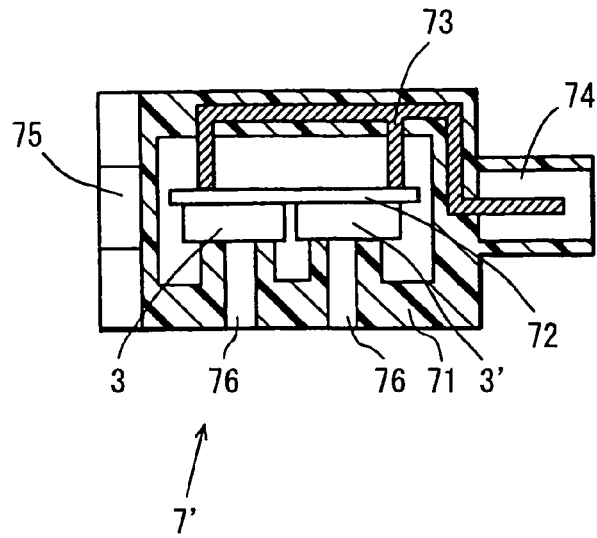
FIG. 5 is a schematic sectional view showing a side door side collision sensor of a side door collision detecting system according to a third embodiment.

The third embodiment of the present invention will be described with reference to FIG. 5. Similar components of a side door collision detecting system of the present embodiment, which are similar to the components of the side door collision detecting system of the first embodiment, will be indicated by the same numerals. A pressure sensor will be alternatively replaces the acceleration sensor 4, which serves as the physical value sensor in the first embodiment. The two side door collision sensors are integrally constituted as shown in FIG. 5 in the third embodiment.

An integrated sensor 7' includes a sensor housing 71 and the door internal pressure sensors 3, 3'. The door internal pressure sensors 3, 3' are included in the sensor housing 71. The door internal pressure sensors 3, 3' are semiconductor pressure sensors, which are structured as the resin-mold integrated circuits (IC). These sensors are well known and therefore, explanation thereof is omitted. One of the door internal pressure sensors 3, 3' serves as the physical value sensor in the present invention.

The door internal pressure sensors 3, 3' are fixed side by side on the principle surface of the substrate 72, which is made of the ceramics or the resin. A terminal 73 is insert molded into the sensor housing 71, and one end of the terminal 73 is connected with the substrate 72 and the other end thereof projects inside a connector portion 74. Thus, the door internal pressure sensors 3, 3' are externally supplied with power through the terminal 73 and the substrate 72. Also, output signals supplied by the door internal pressure sensors 3, 3' are outputted through the substrate 72 and the terminal 73. The mounting portion 75 mounts the sensor housing 71 on the side door panel (not shown) or on the connecting member, which is connected with the side door panel. The sensor housing 71 includes the pressure introducing ports 76, which apply the door internal pressure to a diaphragm portion (not shown) of each of the door internal pressure sensors 3, 3'.

This structure facilitates the installation of the door internal pressure sensors 3, 3' to the side door, which may have a narrow space for the installation. Also, this structure reduces either a number of the necessary components or an amount of necessary materials. Wiring and signal processing may be facilitated. Threshold levels for the door internal pressure sensors 3, 3' may be identical to each other, or may be different from each other. One of the threshold levels may be set smaller than the other such that a small variation of the door internal pressure can be detected.

A modification of the second and third embodiments will be described. In FIG. 4, a pair of the door internal pressure sensor 3 and the acceleration sensor 4 is integrally structured. In FIG. 5, a pair of the two door internal pressure sensors 3, 3' is integrally structured. However, two and more of any sensors, which are different from the above sensors, may be integrally structured if the any sensors can detect the side door collision. The any sensors may detect a sound (acoustic characteristic), light (optical characteristic) or distortion (displacement characteristic), which are generated due to the deformation of the door in the collision. Then, the accuracy of detecting the side collision may be achieved without delay even when the door internal pressure may not be increased enough because of a damage of the side door 2 or because of a small-area collision.

Fourth Embodiment

The fourth embodiment will be described with reference to FIG. 6. Similar components of a side door collision detecting system of the present embodiment, which are similar to the components of the side door collision detecting system of the first embodiment, will be indicated by the same numerals. In the fourth embodiment, the two pressure sensors (door internal pressure sensors) 3, 3' in the third embodiment are integrated on a common semiconductor chip. Here, a chip structure of a diaphragm semiconductor pressure sensor is well known, and therefore explanation thereof is omitted.

Figure 6:
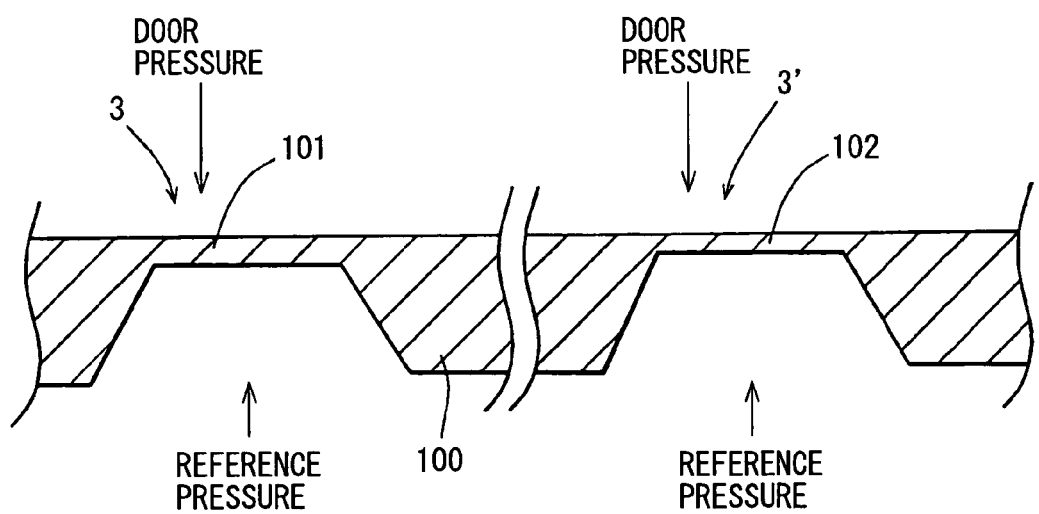
FIG. 6 is a schematic sectional view showing a side door side collision sensor of a side door collision detecting system according to a fourth embodiment.

As shown in FIG. 6, a semiconductor substrate 100 includes two thin portions (diaphragm portions) 101, 102, which are separately arranged at a predetermined interval. A strain gauge (not shown) is formed on each of the two thin portions (diaphragm portions) 101, 102. A reference pressure is applied to one surface of each of two thin portions (diaphragm portions) 101, 102. The door pressure is applied to the other surface of each of two thin portions through the common pressure introducing port 76. This structure substantially reduces a structure size of the sensor for the side door collision detecting system that uses the two door internal pressure sensors.

Fifth Embodiment

The fifth embodiment will be described with reference to FIG. 7. Similar components of a side door collision detecting system of the present embodiment, which are similar to the components of the side door collision detecting system of the first embodiment, will be indicated by the same numerals. In the fifth embodiment, the pressure sensor (door internal pressure sensor) 3 and the acceleration sensor 4 in the second embodiment are integrated on a common semiconductor chip. Here, the chip structure of the diaphragm semiconductor pressure sensor is well known. Also, a chip structure of a diaphragm semiconductor acceleration sensor is well known. Therefore, explanation thereof is omitted.

Figure 7:
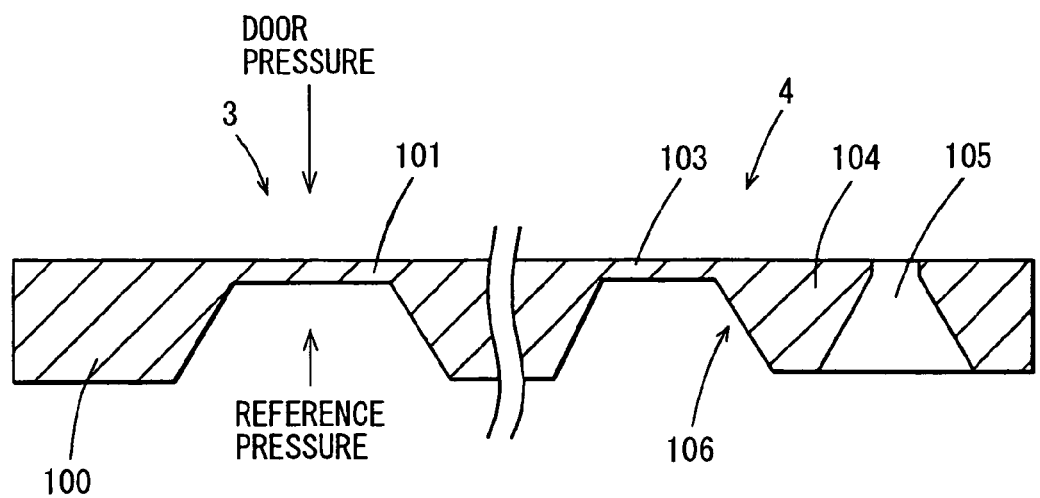
FIG. 7 is a schematic sectional view showing a side door side collision sensor of a side door collision detecting system according to a fifth embodiment.

As shown in FIG. 7, the semiconductor substrate (chip) 100 includes a thin portion (diaphragm portion) 101. A penetrating groove 105 is formed into a U shape such that a cantilever portion 106 is formed to be surrounded by the penetrating groove 105. The cantilever portion 106 includes a thin portion 103 and a mass portion 104. An end portion of the thin portion 103 is connected with the semiconductor substrate 100. The strain gauge (not shown) is formed on each of the two thin portions 101, 103. The reference pressure is applied to one surface of the thin portion 101. The door pressure is applied to the other surface of the thin portion 101 through the pressure introducing port 76. The strain gauge, which is formed on the thin portion 101, detects the door internal pressure and generates an output signal. Similarly, the acceleration, which is applied to the mass portion 104, distorts the thin portion 103, and the strain gauge formed on the thin portion 103 generates an output signal. This structure substantially reduces a structure size of the sensor for the side door collision detecting system that uses the door internal pressure sensor 3 and the acceleration sensor 4. Also, the door internal pressure sensor 3 and the acceleration sensor 4 may be manufactured in a similar manufacturing process.

Figure 8:
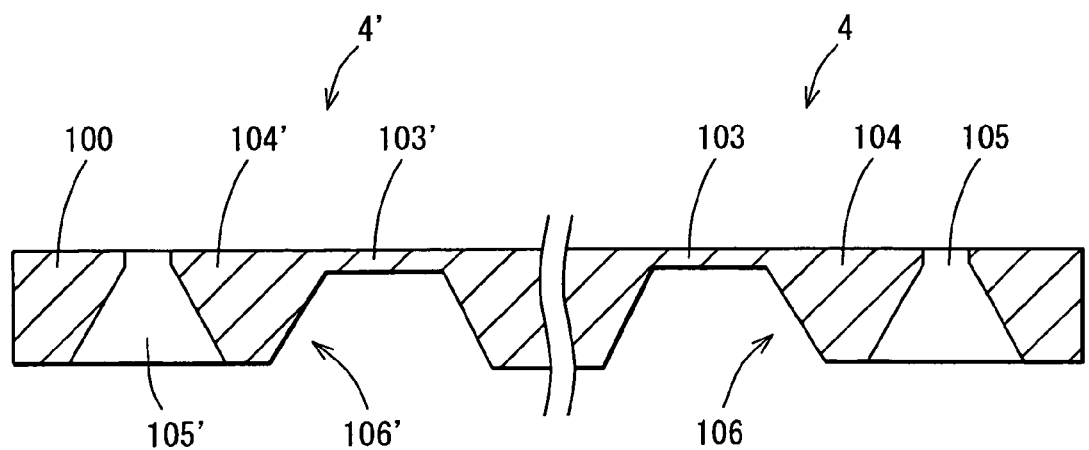
FIG. 8 is a schematic sectional view showing a side door side collision sensor of a side door collision detecting system according to a modification of the fifth embodiment.

A modification of the fifth embodiment will be described. In FIG. 8, another acceleration sensor 4' may be alternatively replace the door internal pressure sensor 3 shown in FIG. 7. In other word, one of two acceleration sensors 4, 4' serves as the main sensor, and the other serves as the safing sensor. Also, any two sensors that detect the side collision to the side door may be alternatively used for a reliable side door collision detecting system when output signals from the any two sensors are processed by use of the circuit shown in FIG. 2 or FIG. 3. The any sensors may detect a sound, light or distortion, which are generated due to the deformation of the door in the collision.

Additional advantages and modifications will readily occur to those skilled in the art. The invention in its broader terms is therefore not limited to the specific details, representative apparatus, and illustrative examples shown and described.

What is claimed is:

1. A side door collision detecting system for a vehicle, comprising:
    an internal pressure sensor that detects an increase of a door internal pressure of a side door of the vehicle, which is changed by a side collision to the side door, wherein:
    the internal pressure sensor outputs an internal pressure signal based on the door internal pressure; and
    the internal pressure sensor is installed in an interior space of the side door;
    a physical value sensor that detects a physical value, which is changed by the side collision, and outputs a physical value signal based on the physical value, wherein the physical value sensor is also installed in the interior space of the side door; and
    a collision determining circuit that determines whether the side collision occurs based on the internal pressure signal and the physical value signal.

2. The side door collision detecting system according to claim 1, wherein:
    the collision determining circuit calculates:
    a corresponding binary signal of each of the internal pressure signal and the physical value signal based on each corresponding predetermined value; and a logical conjunction based on the corresponding binary signal of the internal pressure signal and the corresponding binary signal of the physical value signal; and the collision determining circuit determines whether the side collision occurs based on the logical conjunction result.

3. The side door collision detecting system according to claim 1, wherein:

the collision determining circuit calculates:

means for calculating a first binary signal based on a first threshold value for the internal pressure signal;

a second binary signal based on a second threshold value for the internal pressure signal, which is lower than the first threshold value for the internal pressure signal;

a third binary signal based on a third threshold value for the physical value signal;

a fourth binary signal based on a fourth threshold value for the physical value signal, which is lower than the third threshold value for the physical value signal;

a first logical conjunction based on the first and fourth binary signals;

a second logical conjunction based on the second and third binary signals; and calculating a logical addition based on the first and second logical conjunction results, wherein the collision determining circuit determines whether the side collision occurs based on the logical addition result.

4. The side door collision detecting system according to claim 1, wherein:

the internal pressure sensor, which detects the door internal pressure, is a first internal pressure sensor; and the physical value sensor is a second internal pressure sensor, which detects the door internal pressure.

5. The side door collision detecting system according to claim 1, wherein the physical value, which is detected by the physical value sensor, is other than the door internal pressure.

6. The side door collision detecting system according to claim 5, wherein the physical value, which is detected by the physical value sensor, includes one of an acceleration characteristic, an acoustic characteristic, an optical characteristic and a displacement characteristic.

7. The side door collision detecting system according to claim 1, further comprising a sensor housing, which includes the internal pressure sensor and the physical value sensor.

8. The side door collision detecting system according to claim 1, wherein:

the side door collision detecting system further comprises a sensor housing that includes the internal pressure sensor and the physical value sensor, which are integrally formed on a single chip in the sensor housing;

the internal pressure sensor is a semiconductor pressure sensor; and the physical value sensor is a semiconductor acceleration sensor.

9. An occupant protecting system for a vehicle, comprising:

the side door collision detecting system according to claim 1; and an occupant protecting device that performs a protection of an occupant of the vehicle based on a determining result of the collision determining circuit of the side door collision detecting system.

* * * * *